United States Patent
Kim (10) Patent No.: US 11,413,961 B2
(45) Date of Patent: Aug. 16, 2022

(54) FOLDABLE PEDAL APPARATUS FOR AUTONOMOUS TRAVELING VEHICLE

(71) Applicants: Hyundai Motor Company, Seoul (KR); Kia Motors Corporation, Seoul (KR)

(72) Inventor: Eun Sik Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 262 days.

(21) Appl. No.: 16/995,438

(22) Filed: Aug. 17, 2020

(65) Prior Publication Data
US 2021/0331584 A1 Oct. 28, 2021

(30) Foreign Application Priority Data
Apr. 23, 2020 (KR) .................. 10-2020-0049265

(51) Int. Cl.
| | | |
|---|---|---|
| *G05G 1/30* | (2008.04) | |
| *B60K 26/02* | (2006.01) | |
| *G05G 1/40* | (2008.04) | |
| *F16H 21/44* | (2006.01) | |
| *B60T 7/06* | (2006.01) | |

(Continued)

(52) U.S. Cl.
CPC .............. *B60K 26/02* (2013.01); *B60T 7/042* (2013.01); *B60T 7/06* (2013.01); *F16H 21/44* (2013.01); *G05G 1/40* (2013.01); *B60K 2026/026* (2013.01); *G05D 1/0061* (2013.01)

(58) Field of Classification Search
CPC .. G05G 1/30; G05G 1/32; G05G 1/36; G05G 1/38; G05G 1/40; G05G 1/405; G05G 1/42; G05G 1/44; G05G 1/445; G05G 5/03; G05G 5/05; G05G 5/005; G05G 5/28; B60R 21/09; B60T 7/04; B60T 7/06;
(Continued)

(56) References Cited

U.S. PATENT DOCUMENTS

| | | | | |
|---|---|---|---|---|
| 6,182,525 B1 * | 2/2001 | Bowers | ................. | B60K 23/02 180/274 |
| 6,364,047 B1 * | 4/2002 | Bortolon | ................ | B60K 23/02 74/513 |

(Continued)

FOREIGN PATENT DOCUMENTS

| | | | |
|---|---|---|---|
| KR | 2017-0137427 A | | 12/2017 |
| WO | WO-2021182563 A1 * | | 9/2021 |

OTHER PUBLICATIONS

Machine Translation of WO 2021/182563.*

*Primary Examiner* — Richard W Ridley
*Assistant Examiner* — Brian J McGovern
(74) *Attorney, Agent, or Firm* — Morgan, Lewis & Bockius LLP (57) ABSTRACT

A foldable pedal apparatus of an autonomous traveling vehicle, is configured so that a pedal pad is popped-up by moving toward a driver to be exposed to enable an operation of the pedal pad by a driver in a manual driving mode situation in which the driver directly drives the vehicle, and the pedal pad moves forward and is in close contact with a vehicle body panel to disable the operation of the pedal pad by the driver in an autonomous traveling mode in which the driver does not directly drive the vehicle, facilitating a hidden state where exposure toward the driver is blocked.

20 Claims, 9 Drawing Sheets

(51) Int. Cl.
*B60T 7/04* (2006.01)
*G05D 1/00* (2006.01)

(58) Field of Classification Search
CPC ............... B60K 26/02; B60K 26/021; B60K 2026/021; B60K 2026/024; B60K 2026/026
See application file for complete search history.

(56) References Cited

U.S. PATENT DOCUMENTS

| | | | | |
|---|---|---|---|---|
| 8,770,616 | B1* | 7/2014 | Draper | B60N 3/066 |
| | | | | 297/75 |
| 10,889,226 | B1* | 1/2021 | Dean | B60T 7/06 |
| 10,906,514 | B1* | 2/2021 | Kim | G05G 5/03 |
| 10,946,741 | B1* | 3/2021 | Kim | B60T 7/06 |
| 10,994,611 | B1* | 5/2021 | Kim | G05G 5/28 |
| 11,021,058 | B1* | 6/2021 | Kim | G05G 5/28 |
| 11,225,226 | B1* | 1/2022 | Kim | B60T 7/065 |
| 11,249,506 | B1* | 2/2022 | Kim | B60R 21/09 |
| 11,312,236 | B1* | 4/2022 | Kim | B60R 21/09 |
| 11,327,520 | B1* | 5/2022 | Kim | B60T 7/06 |
| 2003/0094070 | A1* | 5/2003 | O'Neill | G05G 1/36 |
| | | | | 74/560 |
| 2007/0137397 | A1* | 6/2007 | Choi | G05G 1/36 |
| | | | | 74/512 |
| 2009/0223319 | A1* | 9/2009 | Choi | G05G 1/36 |
| | | | | 74/512 |
| 2011/0132134 | A1* | 6/2011 | Kim | F02D 11/02 |
| | | | | 74/514 |
| 2014/0316648 | A1* | 10/2014 | Min | G05G 1/40 |
| | | | | 701/36 |
| 2015/0053038 | A1* | 2/2015 | Kim | F16H 59/105 |
| | | | | 74/473.3 |
| 2015/0322835 | A1* | 11/2015 | Ham | F01N 3/0842 |
| | | | | 701/29.2 |
| 2017/0225570 | A1* | 8/2017 | El Aile | B60R 7/06 |
| 2019/0310678 | A1* | 10/2019 | Wojciechowski | G05G 1/36 |
| 2020/0257329 | A1* | 8/2020 | Kihara | G05G 1/60 |
| 2020/0262321 | A1* | 8/2020 | Masu | B60N 2/20 |
| 2020/0317152 | A1* | 10/2020 | Ghaffari | B60T 7/042 |
| 2020/0317166 | A1* | 10/2020 | Ghaffari | B60K 26/02 |
| 2020/0317167 | A1* | 10/2020 | Ghaffari | G05D 1/0061 |
| 2020/0398725 | A1* | 12/2020 | Mullen | B60N 3/044 |
| 2021/0004040 | A1* | 1/2021 | Dohmen | G05G 1/42 |
| 2021/0109560 | A1* | 4/2021 | Ford | B60K 20/04 |
| 2021/0170988 | A1* | 6/2021 | Villalva Sanchez | B60R 21/09 |
| 2021/0197083 | A1* | 7/2021 | Baumgartner | A63F 13/803 |
| 2021/0331584 | A1* | 10/2021 | Kim | B60T 7/06 |
| 2021/0394798 | A1* | 12/2021 | Kim | B60T 7/12 |
| 2022/0001843 | A1* | 1/2022 | Michael | G05G 1/60 |
| 2022/0011806 | A1* | 1/2022 | Miletto | B60K 23/02 |
| 2022/0048384 | A1* | 2/2022 | Kim | B60K 26/02 |
| 2022/0055477 | A1* | 2/2022 | Kim | G05G 1/44 |
| 2022/0144222 | A1* | 5/2022 | Kim | B60T 7/042 |
| 2022/0144223 | A1* | 5/2022 | Kim | B60T 7/06 |

* cited by examiner

FOLDABLE PEDAL APPARATUS FOR AUTONOMOUS TRAVELING VEHICLE

CROSS REFERENCE TO RELATED APPLICATION

The present application claims priority to Korean Patent Application No. 10-2020-0049265 filed on Apr. 23, 2020, the entire contents of which is incorporated herein for all purposes by this reference.

BACKGROUND OF THE PRESENT INVENTION

Field of the Invention

The present invention relates to a foldable pedal apparatus of an autonomous traveling vehicle, and more specifically, to a technology of a foldable pedal apparatus of an autonomous traveling vehicle, in which a pedal pad is moved toward a driver to be exposed so that the driver's operation is possible in a manual driving mode in which a driver directly drives a vehicle, and the pedal pad is moved to be in close contact with a vehicle body panel which partitions an engine compartment space and an internal space so that the driver's operation is not possible in an autonomous traveling situation, blocking the exposure toward the driver.

Description of Related Art

An autonomous traveling vehicle is a smart vehicle which incorporates an autonomous traveling technology of finding the destination by itself even without the driver directly operating a steering wheel, an accelerator pedal, a brake, or the like, and is recently being developed rapidly.

If the autonomous traveling situation is universally realized, the driver may select a manual driving mode in which the driver directly drives the vehicle and an autonomous traveling mode in which the vehicle travels to the destination by itself without the driver directly driving the vehicle.

Since the driver may rest comfortably by extending his or her feet in the autonomous traveling mode, there is a disadvantage in that when a pedal (an acceleration pedal or a brake pedal) located in a space under a driver seat exists while being exposed to the interior as it is, the driver's rest is disturbed.

Furthermore, the autonomous traveling situation is a situation in which the driver does not operate the pedal (the acceleration pedal or the brake pedal) of the vehicle, and if the driver operates the pedal during autonomous traveling, a vehicle controller is configured to determine the above as a situation in which the driver terminates the autonomous traveling and the driver wants to directly drive the vehicle to terminate a control for the autonomous traveling.

However, since the pedal of the vehicle is configured to be exposed to the space under the driver seat, there is a concern in that the driver unconsciously operates the pedal in the autonomous traveling situation (misoperation situation of the pedal), and in the instant case, there is a concern in that an accident occurs according to a roadway situation, an inter-vehicle distance, or the like.

Accordingly, the technology development for a new pedal apparatus is required in which the pedal pad is exposed to the interior so that the driver's operation is possible in the manual driving mode in which the driver directly drives the vehicle, and the internal exposure of the pedal pad is blocked so that the driver's operation is not possible for the comfortable rest of the driver and safety such as the prevention of the misoperation in the autonomous traveling situation.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a foldable pedal apparatus of an autonomous traveling vehicle in which a pedal pad is moved toward a driver to be exposed so that a driver's operation is possible in a manual driving mode in which a driver directly drives the vehicle, and the pedal pad is moved to be in close contact with a vehicle body panel which partitions an engine compartment space and an internal space so that the driver's operation is not possible in an autonomous traveling situation, blocking the exposure toward the driver, is to enable the comfortable rest of the driver in the autonomous traveling situation, and furthermore, to block a misoperation of a pedal in the autonomous traveling situation, achieving safety improvement.

A foldable pedal apparatus of an autonomous traveling vehicle according to various exemplary embodiments of the present invention for achieving the object includes: a rotating link which is disposed to penetrate a portion of a vehicle body panel partitioning an engine compartment space and an internal space under a driver seat, an actuator which is coupled to one end portion of the rotating link protruding into the engine compartment space through the vehicle body panel to generate power to selectively rotate the rotating link, a frame link which has an upper end portion rotatably coupled to the other end portion of the rotating link protruding into the internal space via a first hinge pin and a lower end portion moving in a predetermined direction when the rotating link is rotated, and a pedal pad which has a lower end portion rotatably coupled to the lower end portion of the frame link via a second hinge pin.

The foldable pedal apparatus of the autonomous traveling vehicle may further include an actuator controller which is mounted in the engine compartment space and electrically connected to the actuator to control an operation of the actuator.

The foldable pedal apparatus of the autonomous traveling vehicle may further include a pedal sensor housing which has a lower end portion fixed to the frame link and an upper end portion coupled to protrude forward with respect to the frame link, and a pad spring which has both end portions configured to be supported by the pedal pad and the pedal sensor housing, is compressed when the pedal pad rotates forward around the second hinge pin in a response to a driver's operation to accumulate an elastic force, and rotates and returns the pedal pad backward with the accumulated elastic force when the driver releases an operating force from the pedal pad.

The foldable pedal apparatus of the autonomous traveling vehicle may further include a pedal sensor housing which has a lower end portion fixed to the frame link and an upper end portion coupled to protrude forward with respect to the frame link, and a housing magnet which is fixedly coupled to the upper end portion of the pedal sensor housing, and when the rotating link is rotated by an operation of the actuator and the frame link moves forward, the housing magnet is magnetically-coupled to the rotating link made of steel to constrain a forward movement of the frame link.

The foldable pedal apparatus of the autonomous traveling vehicle may further include a permanent magnet which is coupled to the lower end portion of the pedal pad through which the second hinge pin passes, and a non-contact pedal sensor which is coupled to the lower end portion of the pedal sensor housing to face the permanent magnet and provided with a PCB, and the non-contact pedal sensor detects a rotating angle of the pedal pad through a change in a magnetic field strength according to a change in a location of the permanent magnet when the pedal pad rotates around the second hinge pin to generate any one signal of a signal related to acceleration or a signal related to braking.

The vehicle body panel includes: a horizontally extending bottom surface, and a stopper protrusion is fixed on the horizontally extending bottom surface of the vehicle body panel, the stopper protrusion being in contact with the lower end portion of the frame link moving backward when the rotating link is rotated by an operation of the actuator and the frame link moves backward to limit a backward movement of the frame link.

A recess groove is formed in a portion which is in contact with the lower end portion of the frame link in the stopper protrusion, the concave groove being recessed concavely inwardly from the stopper protrusion, and as the lower end portion of the frame link is engaged into the concave groove, the lower end portion of the frame link is prevented from being lifted upward by being locked to the concave groove of the stopper protrusion.

A link magnet is coupled to the lower end portion of the frame link, a steel piece is coupled to the stopper protrusion, and as the link magnet and the steel piece are magnetically-coupled when the lower end portion of the frame link is in contact with the stopper protrusion, the backward movement of the frame link is constrained.

The actuator is a rotary-type motor which is fixed in the engine compartment space, and a motor shaft of the rotary-type motor is coupled to one end portion of the rotating link protruding into the engine compartment space.

The vehicle body panel includes: a wall surface which extends vertically and is formed with a panel hole, and the rotating link includes: a first link portion which is provided to penetrate the panel hole and has an end portion, protruding into the engine compartment space, coupled to the actuator, and a second link portion which is bent from the first link portion to protrude upward and rotatably coupled to the upper end portion of the frame link located in the internal space via the first hinge pin, and a length of the second link portion is formed longer than a length of the first link portion.

The panel hole is formed at a minimum size at which the first link portion performs the rotating operation by the operation of the actuator.

When the rotating link is rotated by the operation of the actuator, the second link portion is in close contact with the wall surface of the vehicle body panel, and the frame link moves forward and is superimposed while being adjacent to the second link portion, the pedal pad coupled to the frame link maximally moves toward the wall surface of the vehicle body panel to become a hidden state where an exposure thereof toward a driver is blocked.

When the rotating link is rotated by an operation of the actuator and the second link portion is separated from the wall surface of the vehicle body panel toward the rear where a driver exists and the frame link moves backward and is separated from the second link portion at a predetermined angle, the pedal pad coupled to the frame link becomes a pop-up state in which the pedal pad is exposed to protrude into the internal space where the driver exists.

The frame link is located to be separated from the second link portion at a predetermined angle so that a center line straightly extending a center portion of the first hinge pin and a center portion of the second hinge pin is located behind a reference line perpendicularly extending the horizontally extending bottom surface of the vehicle body panel and the center portion of the first hinge pin when the pedal pad is in the hidden state.

When an operating surface of the pedal pad operated by a driver's foot is formed larger in an external size than the frame link and the pedal pad rotates forward around the second hinge pin, an operating surface of the pedal pad is in contact with and supported by the frame link such that the forward rotation of the pedal pad is constrained.

The vehicle body panel includes: an horizontally extending bottom surface, the lower end portion of the frame link moves in the front and rear direction while being in contact with the horizontally extending bottom surface of the vehicle body panel when the rotating link is rotated, and the lower end portion of the frame link is formed in a round shape to be in line contact with the horizontally extending bottom surface to minimize frictional interference with the horizontally extending bottom surface.

The vehicle body panel includes: an horizontally extending bottom surface, a roller is rotatably coupled to the lower end portion of the frame link, and as the roller rotates while being in contact with the horizontally extending bottom surface when the rotating link is rotated, the lower end portion of the frame link moves in the front and rear direction thereof.

The pedal pad is an organ-type pad which has an upper end portion rotating back and forth around a lower end portion of the pedal pad coupled to the frame link via the second hinge pin.

The pedal pad is any one of a component of an acceleration pedal device or a component of a brake pedal.

The foldable pedal apparatus of the autonomous traveling vehicle according to various exemplary embodiments of the present invention has a configuration which may move the pedal pad in the front and rear direction by the rotation of the rotating link and the frame link when the actuator is operated, and a configuration in which the pedal pad moves toward the driver and is popped-up to be exposed so that the driver's operation of the pedal pad is possible in the manual driving mode situation in which the driver directly drives the vehicle, the pedal pad moves forward to be in close contact with the vehicle body panel to enable the hidden state where the exposure toward the driver is blocked so that the driver's operation of the pedal pad is not possible in the autonomous traveling mode situation in which the driver does not directly drive the vehicle, and may provide the comfortable rest of the driver in the autonomous traveling situation, and furthermore, block the misoperation of the pedal in the autonomous traveling situation, achieving safety improvement.

Furthermore, the present invention may maximally move the pedal pad forward through the structures of the rotating link and the frame link which have relatively simple configurations to be in close contact with the wall surface of the vehicle body panel, securing the space under the driver seat having the maximally wide space in the hidden (hide) state of the pedal pad, and furthermore, increase the amount of protrusions into the interior of the pedal pad, making the driver's operation of the pedal pad more advantageous.

Furthermore, the present invention is characterized in that the size of the panel hole formed in the wall surface of the vehicle body panel is formed at the minimum size at which the first link portion of the rotating link may perform the rotating operation when the actuator is operated, and as a result, may form the panel hole at the maximally small size, maximally decreasing the noise transferred to the interior.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a foldable pedal apparatus of an autonomous traveling vehicle according to various exemplary embodiments of the present invention will be described with reference to the accompanying drawings.

As illustrated in FIGS. 1 to 9, a foldable pedal apparatus of an autonomous traveling vehicle according to various exemplary embodiments of the present invention includes a rotating link 10 which is disposed to penetrate a portion of a vehicle body panel 1 which partitions an engine compartment space and an internal space under a driver seat; an actuator 20 which is coupled to one end portion of the rotating link 10 protruding into the engine compartment space to generate power to selectively rotate the rotating link 10; a frame link 40 which has the upper end portion rotatably coupled to the other end portion of the rotating link 10 protruding into the internal space via a first hinge pin 30 and the lower end portion moving in the front and rear direction when the rotating link 10 is rotated; and a pedal pad 60 which has the lower end portion rotatably coupled to the lower end portion of the frame link 40 via a second hinge pin 50.

The vehicle body panel 1 which partitions the engine compartment space and the internal space under the driver seat may also be a carpet surface.

According to various exemplary embodiments of the present invention further includes an actuator controller 70 which is fixed in the engine compartment space with respect to the vehicle body panel 1 and electrically connected to the actuator 20 to control an operation of the actuator 20.

The actuator controller 70 may be a printed circuit board (PCB).

Furthermore, the present invention further includes a pedal sensor housing 80 which has the lower end portion fixedly coupled to the lower end portion of the frame link 40 and the upper end portion coupled to protrude forward with respect to the frame link 40, and a pad spring 90 which has both end portions configured to be supported by the pedal pad 60 and the pedal sensor housing 80.

As the driver operates the pedal pad 60 with his or her foot, the pad spring 90 is compressed when the pedal pad 60 rotates forward around the second hinge pin 50 to accumulate an elastic force, and when the driver releases an operating force from the pedal pad 60, the pad spring 90 is configured to rotate and return the pedal pad 60 backward with the accumulated elastic force.

Two pad springs 90 are configured to tune a pedaling force through the tuning of a spring force, and to suppress the minute shaking of the pedal pad 60, but the number thereof is not limited to two.

The pad spring 90 is preferably a compressed coil spring.

Furthermore, in various exemplary embodiments of the present invention, the rotating link 10 and the frame link 40 are made of a steel material to secure rigidity (strength), and the present invention is characterized by having a structure in which a housing magnet 100 is fixedly coupled to the upper end portion of the pedal sensor housing 80, and becomes a structure in which when the rotating link 10 is rotated by an operation of the actuator 20 and the frame link 40 moves forward, the housing magnet 100 is in contact with the rotating link 10 made of steel to be magnet-coupled, constraining the forward movement of the frame link 40.

Furthermore, the present invention further includes a permanent magnet (magnet) 110 which is coupled to the lower end portion of the pedal pad 60 through which the second hinge pin 50 passes, and a non-contact pedal sensor 120 which is coupled to the lower end portion of the pedal sensor housing 80 to face the permanent magnet 110 and provided with the PCB.

The lower end portion of the pedal sensor housing 80 is formed with coupling portions 81 which are spaced from each other from side to side and have circular protrusion shapes, the non-contact pedal sensor 120 is fixedly coupled to the internal surfaces of the coupling portions 81, the coupling portions 81 to which the non-contact pedal sensor 120 is coupled are inserted into the lower end portion of the frame link 40 formed in an U shape, and the lower end portion of the pedal pad 60 is inserted into a space between the coupling portions 81 spaced from each other from side to side, and at the instant time, the permanent magnet 110 coupled to the lower end portion of the pedal pad 60 is located to face the coupling portions 81 of the pedal sensor housing 80, and the second hinge pin 50 has a structure of sequentially penetrating and being coupled to the lower end portion of the pedal pad 60, the lower end portion of the frame link 40, the coupling portions 81 of the pedal sensor housing 80, and the non-contact pedal sensor 120.

The printed circuit board (PCB) is provided in the non-contact pedal sensor 120 to face the permanent magnet 110, and the PCB is configured to be electrically connected to a power supply such as a battery through a wire.

When the pedal pad 60 rotates around the second hinge pin 50, the permanent magnet 110 coupled to the lower end portion of the pedal pad 60 rotates together and the location of the pedal pad 60 is changed, and at the instant time, the non-contact pedal sensor 120 detects an rotating angle of the pedal pad 60 through a change in the magnetic field strength according to the change in the rotating location of the permanent magnet 110 to generate any one signal of a signal related to acceleration or a signal related to braking.

There are advantages in that the non-contact pedal sensor 120 may decrease operating noise when compared to a contact sensor directly connected through a link or the like, and further increase the accuracy of an output signal.

The vehicle body panel 1 includes a horizontally extending bottom surface 1a, and a wall surface 1b which partitions the engine compartment space and the internal space as it vertically extends upwards from the bottom surface 1a, and the wall surface 1b is formed with a panel hole 1c having a predetermined size through which the rotating link 10 passes.

A stopper protrusion 130 which is in contact with the lower end portion of the frame link 40 moving backward when the rotating link 10 is rotated by an operation of the actuator 20 and the frame link 40 moves backward to limit a backward movement of the frame link 40 is fixed on the bottom surface 1a of the vehicle body panel 1.

Meanwhile, a concave groove 131 recessed inwardly from the stopper protrusion 130 is formed in a portion of the stopper protrusion 130 which is in contact with the lower end portion of the frame link 40, and as the lower end portion of the frame link 40 is inserted into the concave groove 131, the lower end portion of the frame link 40 becomes a structure which is prevented from being lifted upward by being locked to the concave groove of the stopper protrusion 130.

According to various exemplary embodiments of the present invention, a link magnet 140 is coupled to the lower end portion of the frame link 40, and a steel piece 150 is coupled to the stopper protrusion 130.

Accordingly, the rotating link 10 is rotated by an operation of the actuator 20 and the frame link 40 moves backward, and when the lower end portion of the frame link 40 moving backward is inserted into the concave groove 131 of the stopper protrusion 130 and is in contact with the stopper protrusion 130, the link magnet 140 and the steel piece 150 are magnetically-coupled to each other, and thus the backward movement of the frame link 40 is constrained by the support force by the stopper protrusion 130 and the magnet coupling of the link magnet 140 and the steel piece 150.

The actuator 20 according to various exemplary embodiments of the present invention is a rotating motor 21 which is fixed in the engine compartment space, and has a structure in which a motor shaft 22 of the rotating motor 21 is coupled to one end portion of the rotating link 10 protruding into the engine compartment space to integrally rotate.

The rotating motor 21 may be, for example, a step motor.

The rotating link 10 has a configuration which includes a first link portion 11 which is provided to penetrate the panel hole 1c formed in the vehicle body panel 1 and has the end portion protruding into the engine compartment space coupled to the actuator 20, and a second link portion 12 which is bent once from the first link portion 11 to protrude upward and rotatably coupled to the upper end portion of the frame link 40 located in the internal space via the first hinge pin 30, and includes having a structure which is formed to have the length of the second link portion 12 longer than the length of the first link portion 11.

As the second link portion 12 is formed longer than the first link portion 11, the second link portion 12 may be maximally in close contact with the wall surface 1b of the vehicle body panel 1 even if the first link portion 11 is rotated at a small angle, and as a result, the space under the driver seat having the maximally wide space may be used in the hidden (hide) state of the pedal pad 60, and furthermore, the amount of protrusions toward the interior of the pedal pad 60 may also be increased, making the driver's operation of the pedal pad 60 more advantageous.

The panel hole 1c formed in the wall surface 1b of the vehicle body panel 1 includes being formed at a minimum size at which the first link portion 11 of the rotating link 10 may perform the rotating operation when the actuator 20 is operated, and as a result, there is an advantage in that by forming the panel hole 1c at a maximally small size, it is possible to maximally decrease the noise transferred to the interior.

The pedal pad 60 includes an operating surface 61 which is operated by the driver with his or her foot, and a body portion 62 which is formed to protrude forward from the operating surface 61.

The body portion 62 of the pedal pad 60 is formed with a groove 63 open forward, and one end portion of the pad spring 90 is configured to be inserted into the groove 63.

The lower end portion of the body portion 62 of the pedal pad 60 is rotatably coupled to the lower end portion of the frame link 40 via the second hinge pin 50.

The operating surface 61 of the pedal pad 60 is formed to have a larger external size than the frame link 40.

Accordingly, when the driver depresses the operating surface 61 and applies the operating force, the pedal pad 60 rotates forward around the second hinge pin 50, and at the instant time, the body portion 62 of the pedal pad 60 is inserted between the left and right pillars of the frame link 40 formed in the U shape, and as an operating surface of the pedal pad 60 is in contact with and supported by the left and right pillars of the frame link 40, the forward rotation of the pedal pad 60 is constrained.

To stably move the frame link 40 when the rotating link 10 is rotated according to various exemplary embodiments of the present invention, the lower end portion of the frame link 40 moves in the front and rear direction while being in contact with the horizontally extending bottom surface 1a of the vehicle body panel 1, and at the instant time, the lower end portion of the frame link 40 is configured for being formed in a round 41 shape to be in line contact with the horizontally extending bottom surface 1a of the body portion 1 to minimize frictional interference with the bottom surface 1a of the body portion 1.

Figure 9:
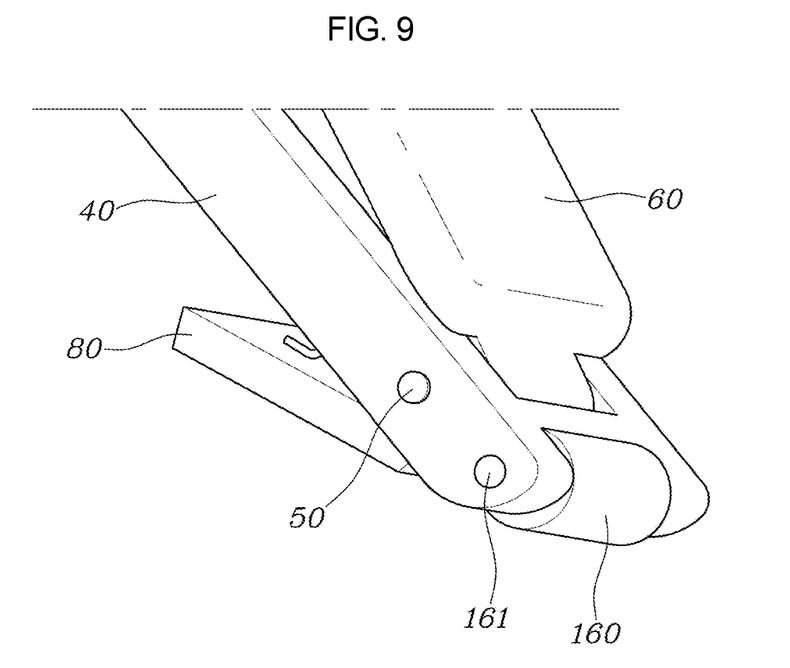
FIG. 9 is a diagram for explaining another exemplary embodiment in which a roller is coupled to the lower end portion of the frame link.

As another example configured for minimizing the frictional interference between the frame link 40 and the bottom surface 1a of the vehicle body panel 1, as illustrated in FIG. 9, the roller 160 is rotatably coupled to the lower end portion of the frame link 40 via a roller shaft 161, and as the roller 160 rotates while being in contact with the horizontally extending bottom surface 1a of the vehicle body panel 1 when the rotating link 10 is rotated, the lower end portion of the frame link 40 may also become a structure of moving in the front and rear direction thereof.

The pedal pad 60 according to various exemplary embodiments of the present invention is configured for being an organ-type pad whose upper end portion rotates back and forth around the lower end portion coupled to the frame link 40 via the second hinge pin 50, and furthermore, the pedal pad 60 may be composed of any one of a component of an accelerator pedal device or a component of a brake pedal.

Figure 1:
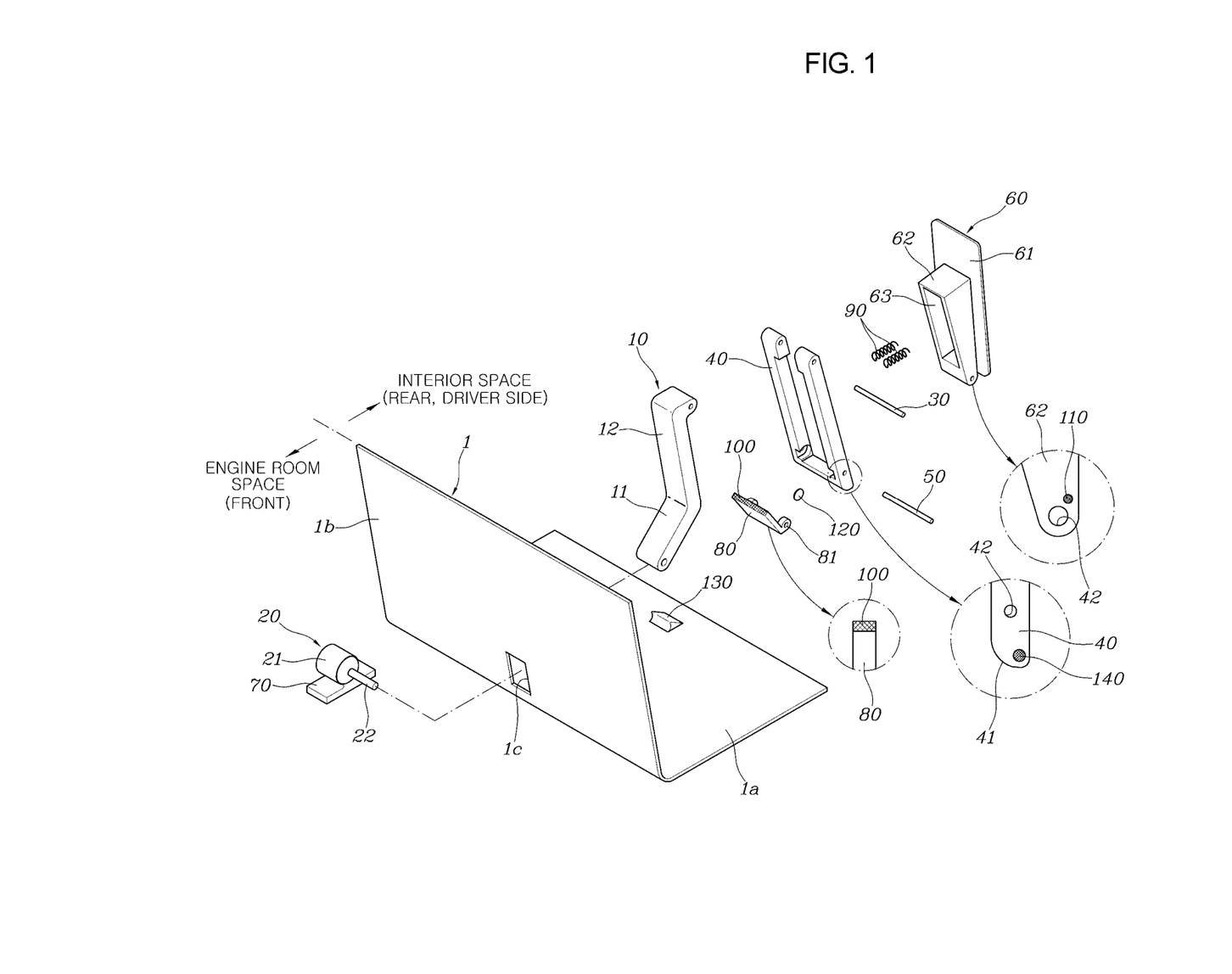
FIG. 1 is an exploded perspective diagram illustrating a foldable pedal apparatus of an autonomous traveling vehicle according to various exemplary embodiments of the present invention.

In FIG. 1, reference numerals 42 and 63 not described are each pin holes through which the second hinge pin 50 passes.

Figure 2:
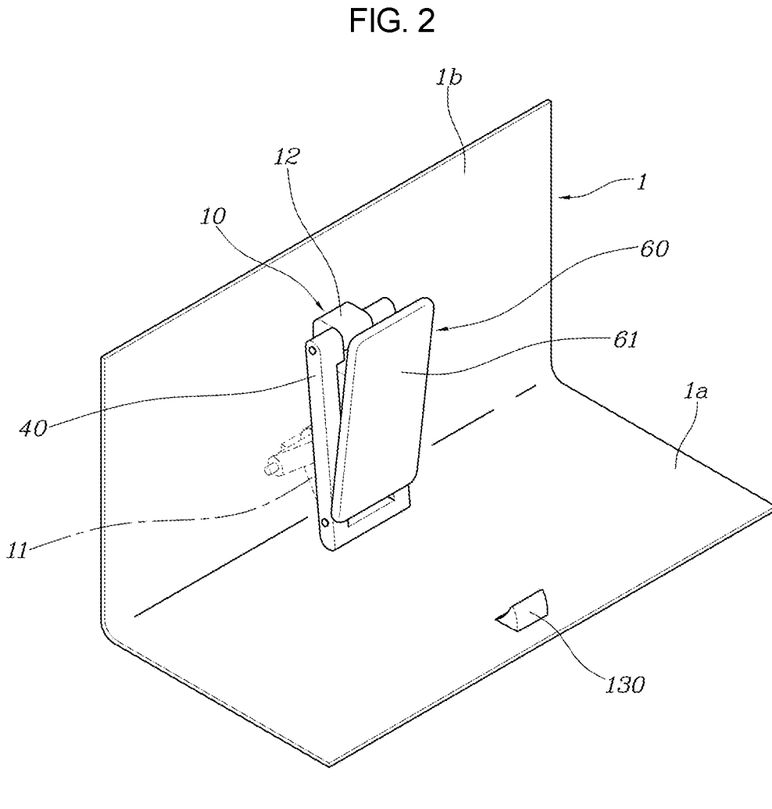
FIG. 2 and FIG. 3 are a front perspective diagram and a rear perspective diagram of the coupled state illustrated in FIG. 1.
Figure 3:
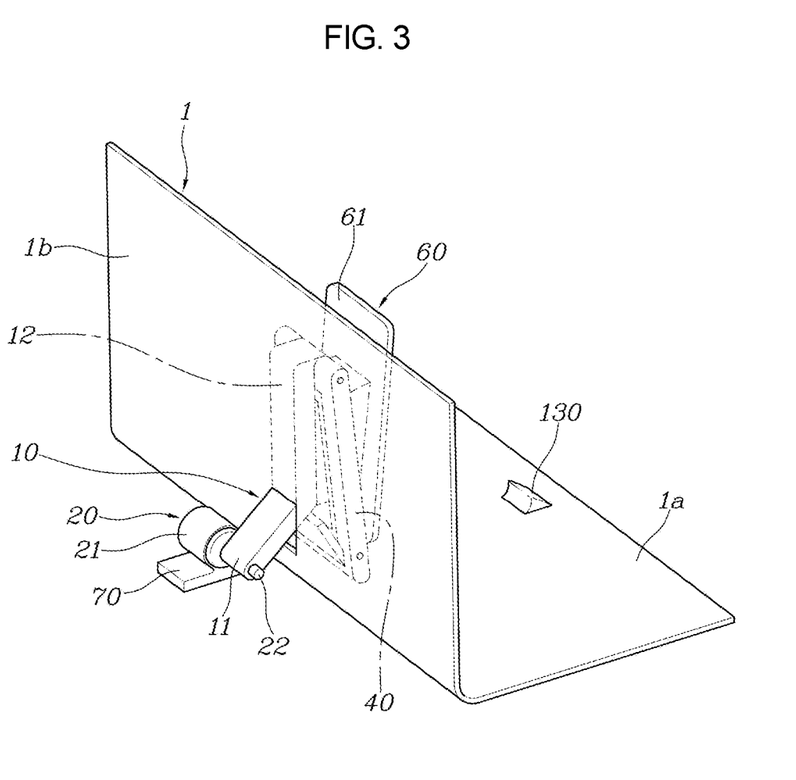
Figure 4:
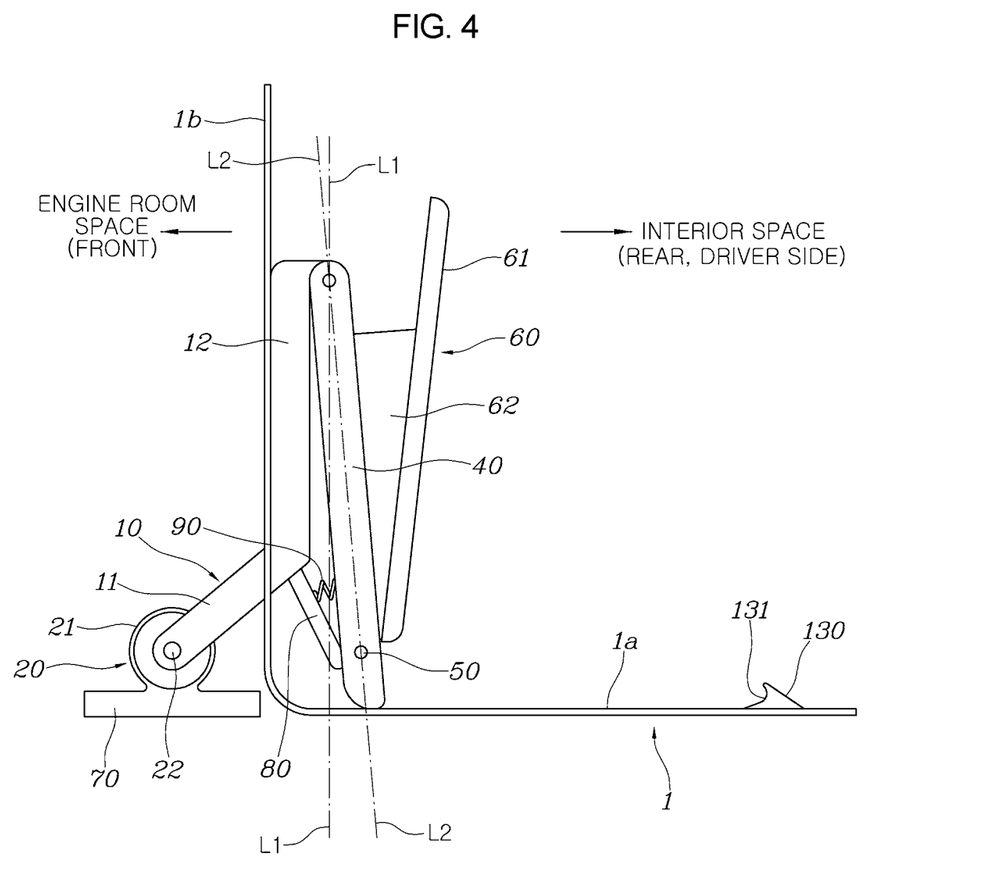
FIG. 4 is a side diagram of FIG. 2 and a diagram illustrating a hidden (hide) state where a pedal pad moves forward and exposure thereof is blocked.

FIGS. 2 and 4 are states where the pedal pad 60 maximally moves forward to be located in the space under the driver seat, and as a result, hidden (hide) states where the exposure of the pedal pad 60 into the interior in which the driver exists is blocked.

When the rotating link 10 is rotated by an operation of the actuator 20 and the second link portion 12 is in close contact with the wall surface 1b of the vehicle body panel 1 and the frame link 40 moves forward and is superimposed while being adjacent to the second link portion 12, the pedal pad 60 coupled to the frame link 40 maximally moves toward the wall surface 1b of the vehicle body panel 1 to become the hidden state where the exposure toward the driver is blocked.

As described above, when the pedal pad 60 is in the hidden state, the space under the driver seat becomes a wide space without interference of the pedal such that the driver may have a comfortable rest in a relax mode, and furthermore, the misoperation of the pedal may be blocked in the autonomous traveling situation, achieving safety improvement.

The exemplary embodiment according to various exemplary embodiments of the present invention is configured for having a configuration configured for implementing the hidden (hide) state of the pedal pad 60 through the simple link structure, and particularly, there is an advantage in that by maximally moving the pedal pad 60 forward through the structures of the rotating link 10 and the frame link 40 to be in close contact with the wall surface 1b of the vehicle body panel 1, it is possible to secure the space under the driver seat having the maximally wide space in the hidden (hide) state of the pedal pad 60.

Furthermore, when the pedal pad 60 is in the hidden (hide) state situation, as illustrated in FIG. 4, the frame link 40 has a structure which is located by being separated from the second link portion 12 at a predetermined angle so that a center line L2 straightly extending a center portion of the first hinge pin 30 and the center portion of the second hinge pin 50 is located behind a reference line L1 perpendicularly extending the bottom surface 1a of the vehicle body panel 1 and the center portion of the first hinge pin 30.

As a result, when the pedal pad 60 is switched from the hidden (hide) state to the pop-up state, the operation proceeds more smoothly, and if the pedal pad 60 is in a situation in which the center line L2 is matched with the reference line L1 or is located in front of the reference line L1 in the hidden (hide) state situation, the operation may be difficult when the pedal pad 60 is switched from the hidden (hide) state to the pop-up state.

Figure 5:
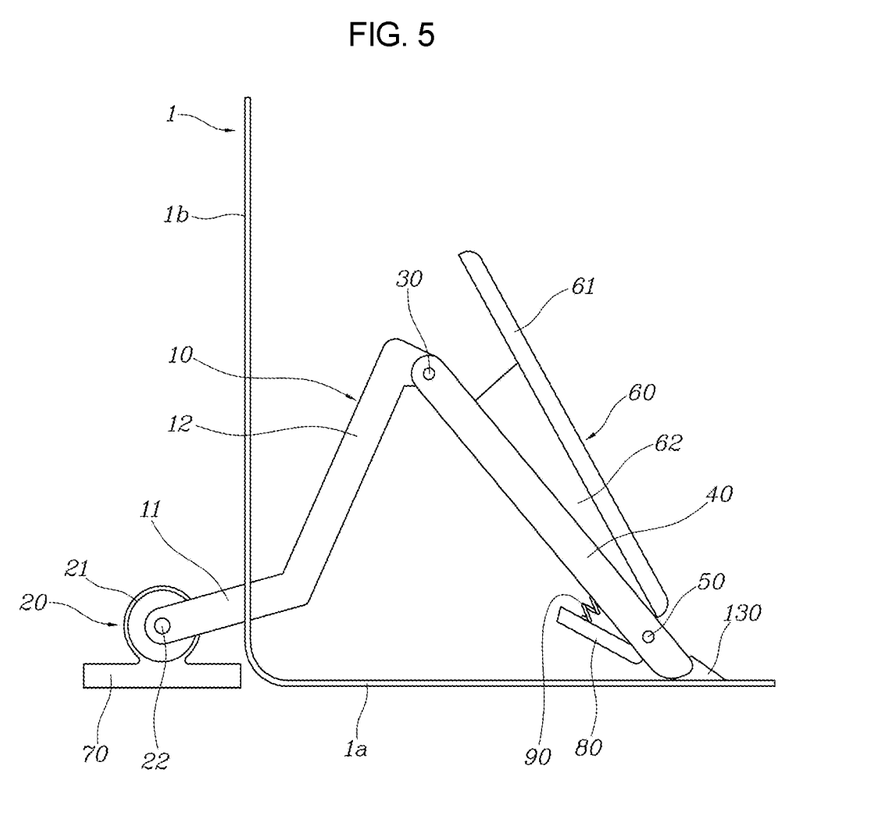
FIG. 5 is a diagram illustrating a pop-up state where the pedal pad protrudes into an internal space.

FIG. 5 is a pop-up state where the pedal pad 60 is exposed to protrude into the internal space.

In the hidden (hide) state of the pedal pad 60 as illustrated in FIG. 4, when the rotating link 10 is rotated by an operation of the actuator 20 and the second link portion 12 is separated from the wall surface 1b of the vehicle body panel 1 backward where the driver exists and the frame link 40 moves backward and is separated from the second link portion 12 at a predetermined angle, the pedal pad 60 coupled to the frame link 40 is in the pop-up state in which the pedal pad 60 is exposed to protrude into the internal space where the driver exists.

As illustrated in FIG. 5, when the pedal pad 60 is in the pop-up state in which the pedal pad 60 moves toward the driver to be exposed, the driver depresses the operating surface 61 of the exposed pedal pad 60 to perform a normal pedal operation.

When the pedal pad 60 is in the pop-up state in which the pedal pad 60 is exposed into the internal space, the lower end portion of the frame link 40 is locked and supported by the stopper protrusion 130, and at the instant time, as an angle between the second link portion 12 and the frame link 40 is almost a right angle, the driver depresses the operating surface 61 of the pedal pad 60 to apply load and thus the load is not transferred in a direction in which the rotating motor 21 rotates, preventing a phenomenon in which overload is applied to the rotating motor 21, and as a result, there is an advantage in that it is possible to minimize the capacity of the motor, decreasing the cost.

Furthermore, the lower end portion of the frame link 40 may be locked and supported by the stopper protrusion 130 in the state where the pedal pad 60 is popped-up, decreasing the load supported by the rotating motor 21, and as a result, there is an advantage in that it is possible to minimize the capacity of the motor, decreasing the cost.

Figure 6:
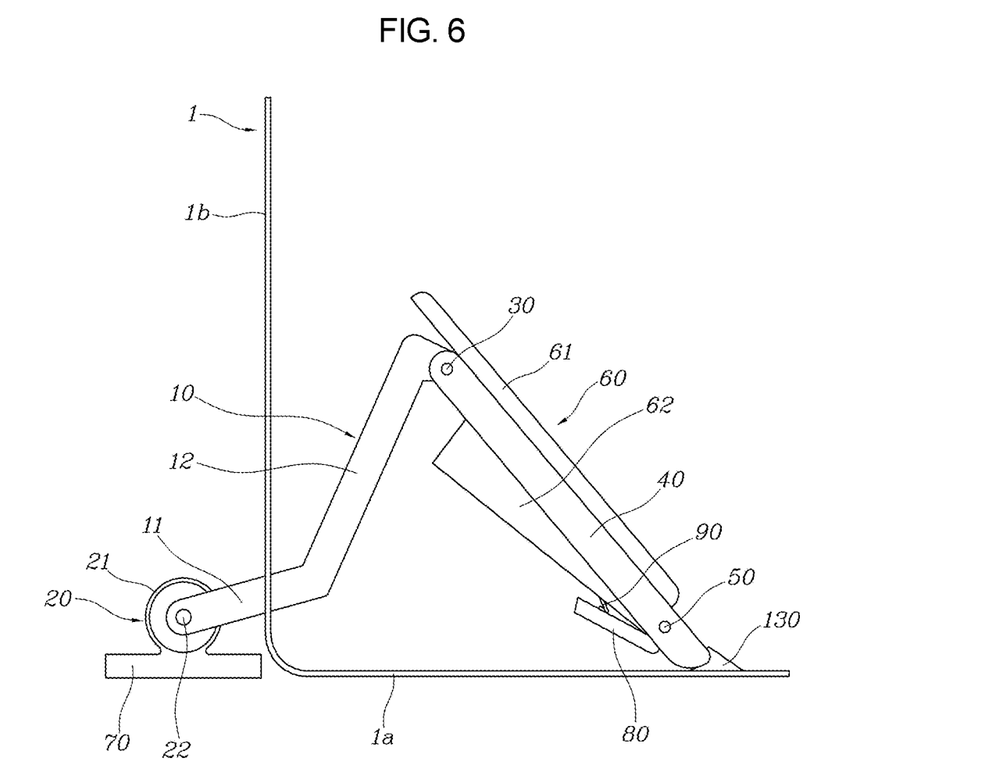
FIG. 6 is a diagram illustrating a state where the pedal pad in the pop-up state operates normally.
Figure 7:
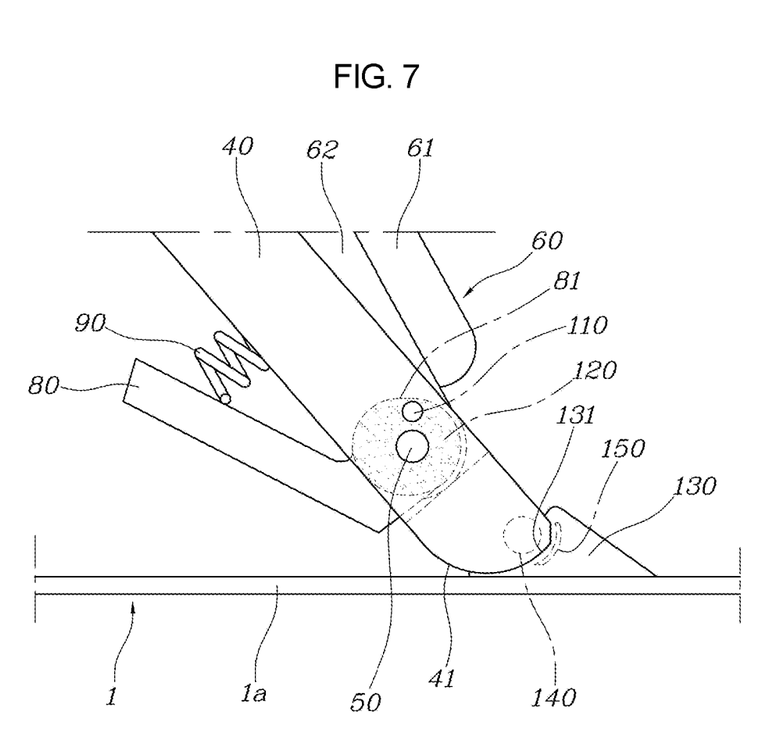
FIG. 7 is an enlarged diagram illustrating a state where the lower end portion of a frame link is in contact with and supported by a stopper protrusion.
Figure 8:
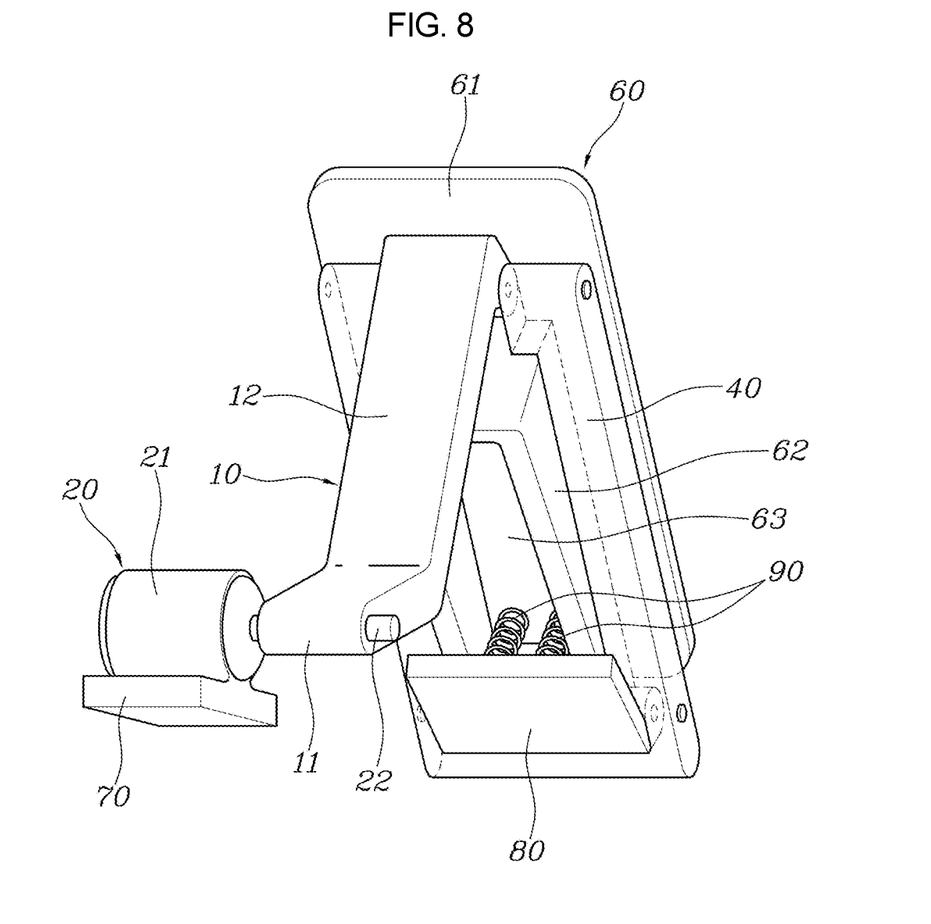
FIG. 8 is a rear diagram illustrating a state where a vehicle body panel is removed from FIG. 6.

FIG. 6 is a state where the driver depresses with his or her foot and operates the pedal pad 60 popped-up to protrude into the internal space.

When the driver depresses and operates the operating surface 61 of the pedal pad 60 popped-up to protrude into the internal space with his or her foot, the pedal pad 60 rotates forward around the second hinge pin 50, and the pad spring 90 is compressed.

Furthermore, the permanent magnet 110 coupled to a body portion 62 of the pedal pad 60 is also rotated together by the forward rotation of the pedal pad 60 and the location of the pedal pad 60 according to the rotation is changed, and at the instant time, the non-contact pedal sensor 120 coupled to the pedal sensor housing 80 detects the rotating angle of the pedal pad 60 through a change in the magnetic field strength according to the change in the rotating location of the permanent magnet 110 to generate any one signal of a signal related to acceleration or a signal related to braking.

As described above, the foldable pedal apparatus of the autonomous traveling vehicle according to various exemplary embodiments of the present invention has a configuration which may move the pedal pad 60 in the front and rear direction by the rotation of the rotating link 10 and the frame link 40 when the actuator 20 is operated, and a configuration in which the pedal pad 60 moves toward the driver and is popped-up to be exposed so that the driver's operation of the pedal pad 60 is possible in the manual driving mode situation in which the driver directly drives the vehicle, the pedal pad 60 moves forward to be in close contact with the vehicle body panel 1 to enable the hidden state where the exposure toward the driver is blocked so that the driver's operation of the pedal pad is not possible in the autonomous traveling mode situation in which the driver does not directly drive the vehicle, and may provide the comfortable rest of the driver in the autonomous traveling situation, and furthermore, block the misoperation of the pedal in the autonomous traveling situation, achieving safety improvement.

Furthermore, the present invention may maximally move the pedal pad 60 forward through the structures of the rotating link 10 and the frame link 40 which have relatively simple configurations to be in close contact with the wall surface 1b of the vehicle body panel 1, securing the space under the driver seat having the maximally wide space in the hidden (hide) state of the pedal pad 60, and furthermore, increase the amount of protrusions into the interior of the pedal pad 60, making the driver's operation of the pedal pad 60 more advantageous.

Furthermore, the present invention is characterized in that the size of the panel hole 1c formed in the wall surface 1b of the vehicle body panel 1 is formed at the minimum size at which the first link portion 11 of the rotating link 10 may perform the rotating operation when the actuator 20 is operated, and as a result, may form the panel hole 1c at the maximally small size, maximally decreasing the noise transferred to the interior.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable pedal apparatus of a vehicle, the foldable pedal apparatus comprising:
    a rotating link disposed to penetrate a portion of a vehicle body panel partitioning an engine compartment space and an internal space under a driver seat;
    an actuator coupled to a first end portion of the rotating link protruding into the engine compartment space through the vehicle body panel to generate power to selectively rotate the rotating link;
    a frame link having an upper end portion rotatably coupled to a second end portion of the rotating link protruding into the internal space via a first hinge pin and a lower end portion moving in a predetermined direction when the rotating link is rotated; and
    a pedal pad having a lower end portion rotatably coupled to the lower end portion of the frame link via a second hinge pin.

2. The foldable pedal apparatus according to claim 1, further including:
    an actuator controller mounted in the engine compartment space and electrically connected to the actuator to control an operation of the actuator.

3. The foldable pedal apparatus according to claim 1, further including:
    a pedal sensor housing which has a lower end portion fixed to the frame link and an upper end portion formed to protrude forward with respect to the frame link; and
    a pad spring which has first and second end portions supported by the pedal pad and the pedal sensor housing, respectively, is compressed when the pedal pad rotates forward around the second hinge pin in a response to a driver's operation to accumulate an elastic force, and rotates and returns the pedal pad backward with the accumulated elastic force in a response that the driver releases an operating force from the pedal pad.

4. The foldable pedal apparatus according to claim 1, further including:
    a pedal sensor housing which has a lower end portion fixed to the frame link and an upper end portion formed to protrude forward with respect to the frame link; and
    a housing magnet which is fixedly coupled to the upper end portion of the pedal sensor housing, wherein when the rotating link is rotated by an operation of the actuator and the frame link moves forward, the housing magnet is magnetically-coupled to the rotating link made of steel to constrain a forward movement of the frame link.

5. The foldable pedal apparatus according to claim 1, further including:
 a permanent magnet which is coupled to the lower end portion of the pedal pad through which the second hinge pin passes; and
 a non-contact pedal sensor which is coupled to the lower end portion of the pedal sensor housing to face the permanent magnet and provided with a printed circuit board (PCB),
 wherein the non-contact pedal sensor detects a rotating angle of the pedal pad through a change in a magnetic field strength according to a change in a location of the permanent magnet when the pedal pad rotates around the second hinge pin to generate one of a signal related to acceleration or a signal related to braking.

6. The foldable pedal apparatus according to claim 1, wherein the vehicle body panel includes a horizontally extending bottom surface, and
 wherein a stopper protrusion is fixed on the horizontally extending bottom surface of the vehicle body panel, the stopper protrusion being in contact with the lower end portion of the frame link moving backward when the rotating link is rotated by an operation of the actuator and the frame link moves backward to limit a backward movement of the frame link.

7. The foldable pedal apparatus according to claim 6, wherein the stopper protrusion includes a concave groove formed in a portion of the stopper protrusion which is in contact with the lower end portion of the frame link, the concave groove being recessed inwardly from the stopper protrusion, and
 wherein as the lower end portion of the frame link is engaged into the concave groove, the lower end portion of the frame link is prevented from being lifted upward by being locked to the concave groove of the stopper protrusion.

8. The foldable pedal apparatus according to claim 6, wherein a link magnet is coupled to the lower end portion of the frame link,
 wherein a steel piece is coupled to the stopper protrusion, and
 wherein as the link magnet and the steel piece are magnetically-coupled when the lower end portion of the frame link is in contact with the stopper protrusion, the backward movement of the frame link is constrained by magnetic force of the link magnet and the steel piece.

9. The foldable pedal apparatus according to claim 1, wherein the actuator is a rotary motor which is fixed in the engine compartment space, and
 wherein a motor shaft of the rotary motor is coupled to the first end portion of the rotating link protruding into the engine compartment space.

10. The foldable pedal apparatus according to claim 1, wherein the vehicle body panel includes a wall surface formed with a panel hole, and
 wherein the rotating link includes:
  a first link portion which is provided to penetrate the panel hole and has an end portion protruding into the engine compartment space and coupled to the actuator; and
  a second link portion which is bent from the first link portion to protrude upward and rotatably coupled to the upper end portion of the frame link located in the internal space via the first hinge pin.

11. The foldable pedal apparatus according to claim 10, wherein a length of the second link portion is formed longer than a length of the first link portion.

12. The foldable pedal apparatus according to claim 10, wherein the panel hole is formed at a predetermined size at which the first link portion performs a rotating operation thereof by an operation of the actuator.

13. The foldable pedal apparatus according to claim 10, wherein when the rotating link is rotated by an operation of the actuator and the second link portion is in contact with the wall surface of the vehicle body panel, and the frame link moves forward and is superimposed while being adjacent to the second link portion, the pedal pad coupled to the frame link maximally moves toward the wall surface of the vehicle body panel to become a hidden state.

14. The foldable pedal apparatus according to claim 10, wherein when the rotating link is rotated by an operation of the actuator and the second link portion is separated from the wall surface of the vehicle body panel toward a rear where a driver exists and the frame link moves backward and is separated from the second link portion at a predetermined angle, the pedal pad coupled to the frame link becomes a pop-up state in which the pedal pad is exposed to protrude into the internal space where the driver exists.

15. The foldable pedal apparatus according to claim 13, wherein the vehicle body panel includes a horizontally extending bottom surface, and
 wherein the frame link is located to be separated from the second link portion at a predetermined angle so that a center line straightly extending a center portion of the first hinge pin and a center portion of the second hinge pin is located behind a reference line perpendicularly extending the horizontally extending bottom surface of the vehicle body panel and the center portion of the first hinge pin when the pedal pad is in the hidden state.

16. The foldable pedal apparatus according to claim 1, wherein when an operating surface of the pedal pad operated by a driver's foot is formed larger in an external size than the frame link and the pedal pad rotates forward around the second hinge pin, an operating surface of the pedal pad is in contact with and supported by the frame link so that a forward rotation of the pedal pad is constrained.

17. The foldable pedal apparatus according to claim 1, wherein the vehicle body panel includes an horizontally extending bottom surface,
 wherein the lower end portion of the frame link moves in the predetermined direction while being in contact with the horizontally extending bottom surface of the vehicle body panel when the rotating link is rotated, and
 wherein the lower end portion of the frame link is formed in a round shape to be in line contact with the horizontally extending bottom surface to minimize frictional interference with the horizontally extending bottom surface.

18. The foldable pedal apparatus according to claim 1, wherein the vehicle body panel includes an horizontally extending bottom surface,
 wherein a roller is rotatably coupled to the lower end portion of the frame link, and
 wherein as the roller rotates while being in contact with the horizontally extending bottom surface when the rotating link is rotated, the lower end portion of the frame link moves in the predetermined direction thereof.

19. The foldable pedal apparatus according to claim 1, wherein the pedal pad is an organ pad which has an upper end portion rotating back and forth around a lower end portion of the pedal pad coupled to the frame link via the second hinge pin.

20. The foldable pedal apparatus according to claim 1, wherein the pedal pad is one of a component of an acceleration pedal device or a component of a brake pedal.

* * * * *